Sept. 29, 1959 R. C. THOR ET AL 2,906,919

DEFLECTION CIRCUIT

Filed Dec. 27, 1955 3 Sheets-Sheet 1

INVENTORS:
ROBERT C. THOR,
JOE B. LINKER JR.,
BY Donald H. Timbie
THEIR ATTORNEY.

DEFLECTION CIRCUIT

Filed Dec. 27, 1955 3 Sheets-Sheet 2

INVENTORS:
ROBERT C. THOR,
JOE B. LINKER JR.,

BY Donald N. Timbie

THEIR ATTORNEY.

INVENTORS:
ROBERT C. THOR,
JOE B. LINKER JR.,
BY Donald N. Timbie
THEIR ATTORNEY.

United States Patent Office 2,906,919

Patented Sept. 29, 1959

2,906,919

DEFLECTION CIRCUIT

Robert C. Thor, Liverpool, and Joe B. Linker, Jr., Syracuse, N.Y., assignors to General Electric Company, a corporation of New York Application December 27, 1955, Serial No. 555,367

16 Claims. (Cl. 315—24)

This invention relates to improvements in magnetic deflection circuits.

In different types of apparatus, it is desired to deflect a beam of electrons or other electrical particles back and forth over a target area in a series of parallel lines so that the beam may be said to scan a portion of the target area. The scanning pattern thus produced is generally termed a raster. If the center of the curvature of the target area coincides with the center of deflection of the beam, the various dimensions of the raster are proportional to the angles through which the beam is deflected. However, if these centers do not coincide, the raster is distorted as the dimensions of the raster are not proportional to the angles through which the beam is deflected. If the center of the beam deflection lies between the target area and the center of curvature of the target area, pincushion distortion is produced. On the other hand, if the center of curvature of the target area is between the target area and the center of beam deflection, barrel distortion is produced. In television receivers, for example, the distortion caused by the fact that the center of curvature of the phosphor screen does not coincide with the center of deflection of the beam is usually such as to make the raster have the shape of a pincushion. In some arrangements, the barrel type distortion may be present and in others pincushion distortion may be present in one direction and barrel distortion in the other.

In apparatus having electromagnetic deflection of a single beam, these types of raster distortion can be reduced by changing the characteristics of the magnetic field causing the beam deflection. This may be done by placing magnets adjacent to the deflection yoke, by altering the distribution of the windings in the deflection yoke or by using active elements including an auxiliary deflection control. However, where several beams are deflected by the same yoke, as in certain types of color television receivers, these methods of altering the characteristics of the deflection field have different effects on the various beams because the beams are necessarily in different places. The net result is that the required registration of the beams is upset, that is they no longer strike the target at the same or approximately the same point. The same difficulties are encountered in single beam devices if the beam is caused to follow paths through the electromagnetic deflection means that are different from the paths followed as a result of the normal action of the deflection means.

Making the center of curvature of the target area coincide with the center of beam deflection may eliminate raster distortion as far as the actual raster traced by the beam or beams is concerned, but an image formed on a spherical surface appears to be compressed or expanded at the outer edges. This method is, therefore, not generally applicable to either single or multiple beam image reproducing devices. Even in non-image producing devices such as camera tubes, this remedy may not be practical.

For reasons previously discussed, some ways suggested in the prior art for correcting raster distortion are not applicable to apparatus in which a plurality of beams are deflected by a single deflection yoke.

Therefore, it is an object of this invention to provide an improved deflection circuit that will cause a plurality of beams to trace an undistorted raster and will not interfere with the relative paths followed by the beams.

Distortion correction circuits suggested in the prior art are either not applicable to both horizontal and vertical deflection circuits, or their incorporation into both circuits is such as to require duplication of components.

Another object of this invention is to provide a single circuit that corrects for distortion in both the vertical and horizontal deflections.

Many of the distortion correction circuits of the prior art are of such nature that they can not be incorporated into all types of electromagnetic beam deflection circuits.

Accordingly, it is another object of this invention to provide a distortion correction circuit that is applicable to any type of electromagnetic deflection circuit.

In previously known raster distortion correction circuits, it has generally been necessary to derive a parabolic voltage wave from one deflection circuit and apply it to a control means in the other deflection circuit. Because the voltage waves normally derived from a deflection circuit are of sawtooth shape, additional components must be provided to convert the sawtooth voltage wave into a wave of parabolic shape.

Accordingly, it is another object of this invention to provide a raster distortion correction circuit that operates in response to correction voltages, or currents having a sawtooth shape so that the voltage or current normally and easily derived from a deflection circuit may be used directly.

Some of the advantages of this invention are its simplicity, the fact that it requires few components and that it is inexpensive to manufacture.

Briefly, the manner in which these objectives and advantages may be achieved in accordance with this invention is as follows.

If distortion is to be reduced in the horizontal direction, a passive element in the form of control impedance is connected in series or shunt relationship with the horizontal deflection yoke and its magnitude is varied at the vertical deflection frequency. The nature of the control impedance is such that its magnitude may be varied in a suitable non-linear fashion by proper application of a linearly changing control signal or electrical wave of current or voltage. Such currents or voltages are readily and directly obtained from the vertical deflection circuit. Because the control impedance is non-linear, the net result of the operation is to modulate the currents of horizontal deflection frequency flowing in the control impedance at the vertical deflection frequency. For best results the modulation should be performed in such manner that currents of the vertical deflection frequency do not appear in the horizontal deflection yoke as this would cause a skewing of the raster so that one diagonal in a rectangular presentation would be longer than the other. Elimination or reduction of vertical distortion is achieved in a corresponding manner, the control impedance being connected in series or shunt with the vertical deflection yoke and its value being varied in a suitable non-linear fashion by application of a linear control signal or electrical waves of voltage or currents which may easily be derived directly from the horizontal deflection circuit. Once again the variation or modulation is preferably carried on in such manner that currents of the horizontal deflection frequency do not appear in the vertical deflection yoke. The control signal or electrical wave of voltages or currents may be derived from other circuits than the deflection circuits, but in general they provide the most convenient source.

Simultaneous reduction or elimination of both vertical and horizontal distortion can be achieved by connecting control impedances in series or shunt circuit relationship with each deflection winding in such manner that the magnitude of the control impedance in circuit with each deflection yoke is varied by substantially linear control signal or electrical wave of voltage or current derived from the control impedance in series or shunt with the other deflection yoke. If similar types of distortion are to be reduced in each deflection direction, the control impedances are generally connected in like circuit relationship with the respective yokes, i.e., each in series or each in shunt. On the other hand, if the types of distortion to be reduced in the different deflection direction are not alike, the control impedances are respectively connected in series with one deflection yoke and in shunt with the other. In all such arrangements, the control signal or electrical wave of voltage or current to be applied to an impedance in circuit relationship with one deflection yoke may be derived from the impedance in circuit relationship with the other deflection yoke.

The manner in which the above objectives and advantages may be attained in accordance with the principles of this invention will be more clearly understood after a detailed consideration of the following drawings in which.

Figures 1, 2, 2A, 3A, 3B, 3C, 3D, 4, 5, 6, 7:
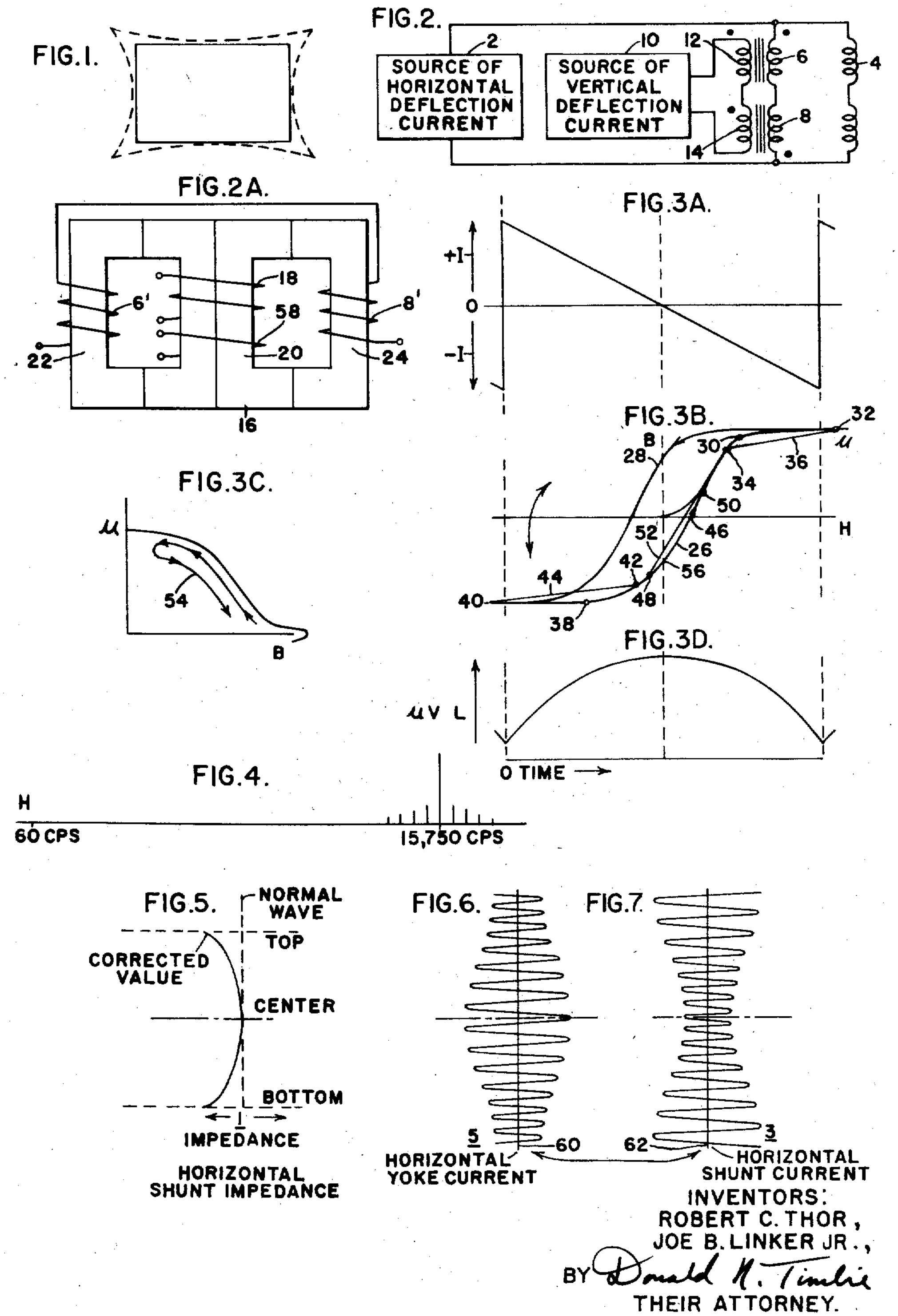
Figure 1 illustrates a raster having pincushion distortion.
Figure 2 illustrates a circuit for correcting pincushion distortion in the horizontal direction.
Figure 2A illustrates a core structure that may be used in various embodiments of the invention.
Figure 3A illustrates a typical waveshape for a deflection current.
Figure 3B illustrates one form of relationship between the flux and magnetomotive force for various situations in the circuits of the invention.
Figure 3C illustrates a typical relationship between the permeability and the flux density of the magnetic core material.
Figure 3D illustrates the type of change in the values of the control inductance of this invention during a cycle of operation.
Figure 4 is a general illustration of the spectrum of the currents existing in a horizontal deflection yoke when it is in a circuit incorporating the principles of this invention.
Figure 8:
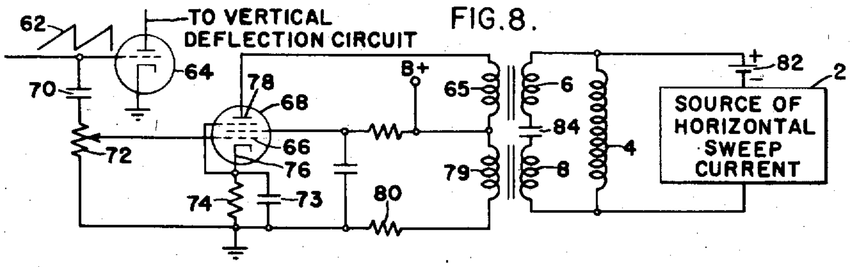
Figure 9:
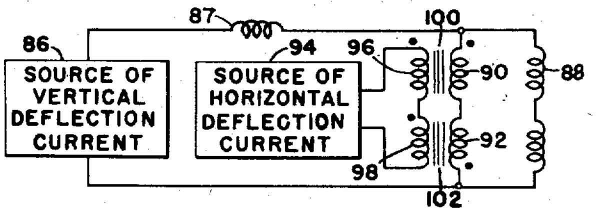
Figure 10:
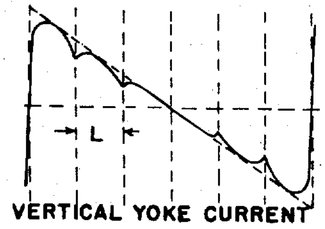
Figure 13:
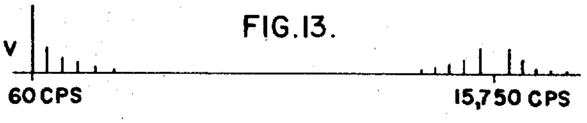
Figure 14:
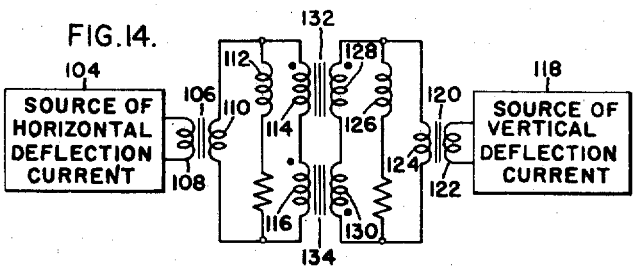
Figure 11:
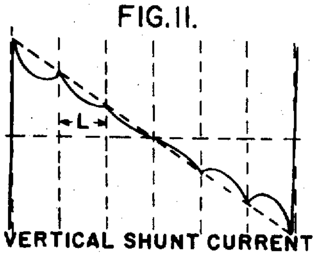
Figures 12, 15, 16:
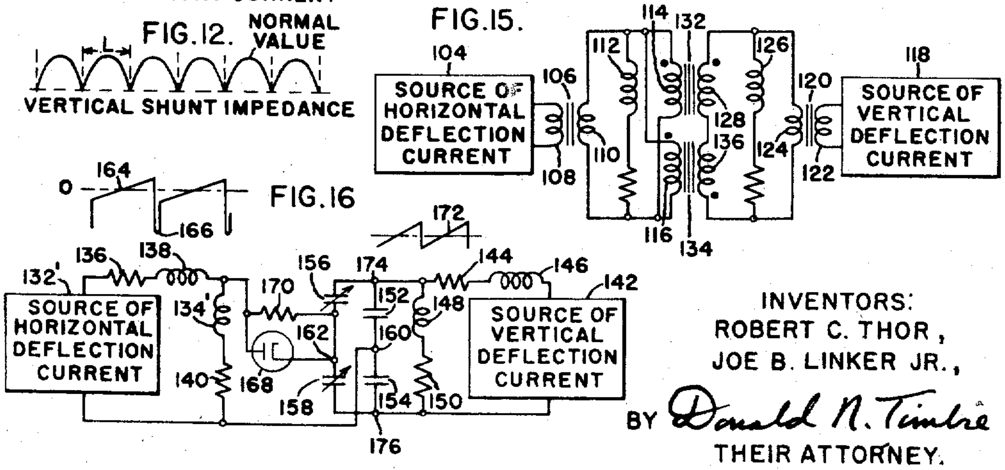
Figure 17:
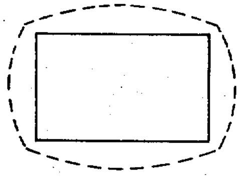
Figure 18:
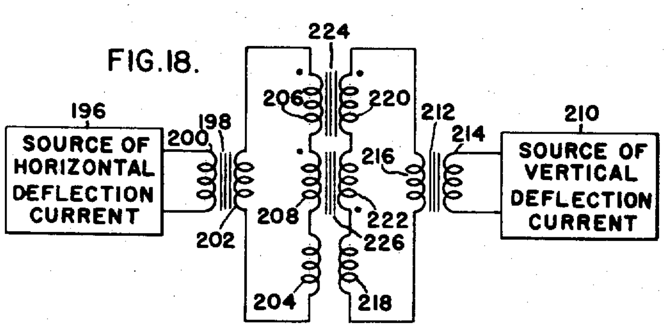
Figure 19:
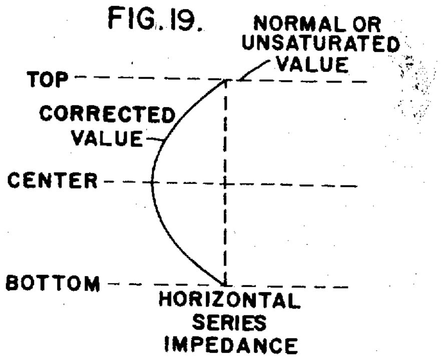
Figure 20:
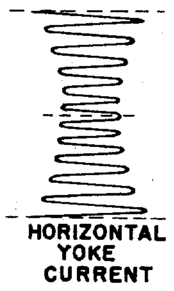
Figure 22:
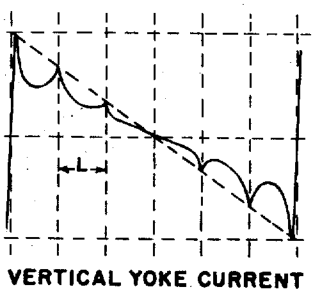
Figure 23:
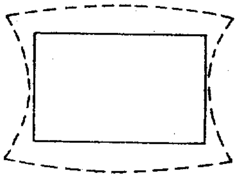
Figure 21:
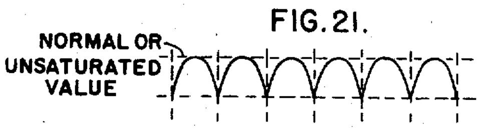

Figure 5 indicates the variations in the impedance of the control shunt in the circuit of Figure 2;

Figure 6 illustrates the current variations in the horizontal yoke of Figure 2;

Figure 7 illustrates the current in the control shunt of Figure 2;

Figure 8 illustrates another embodiment of this invention whereby pincushion correction is effected in the horizontal direction;

Figure 9 illustrates a circuit embodying the principles of this invention whereby pincushion distortion in the vertical direction is corrected;

Figure 10 illustrates the current flowing in the vertical deflection yoke of Figure 9;

Figure 11 illustrates the current flowing in the control shunt of Figure 9;

Figure 12 illustrates the variations in impedance of the control shunt of Figure 9;

Figure 13 illustrates a spectrum of currents flowing in the vertical deflection yoke of Figure 9;

Figures 14 and 15 illustrate different circuits embodying the principles of this invention wherein pincushion distortion in both horizontal and vertical directions is reduced simultaneously;

Figure 16 illustrates a circuit that makes use of non-linear capacitances for the reduction of pincushion distortion in both horizontal and vertical directions;

Figure 17 illustrates a raster having barrel distortion in both the horizontal and vertical directions;

Figure 18 illustrates a circuit embodying the principles of this invention for the simultaneous reduction of barrel distortion in the vertical and horizontal directions;

Figure 19 illustrates the variations in the impedance in series with the horizontal deflection yoke of Figure 18;

Figure 20 illustrates the current flowing in the horizontal deflection yoke of Figure 18;

Figure 21 illustrates the variations in the impedance in series with the vertical deflection yoke of Figure 18;

Figure 22 illustrates the current flowing in the vertical deflection yoke of Figure 18; and Figure 23 illustrates a raster having pincushion distortion in the horizontal direction and barrel distortion in the vertical direction.

Before considering the circuits for reducing or eliminating pincushion distortion, it is well to consider their required function. The dotted line of Figure 1 represents the outline of a raster in which both horizontal and vertical pincushion distortion are present. It can be seen that desired distortionless rectangular raster, such as indicated by the solid line, may be produced if the amplitude of the horizontal deflection is reduced at the top and bottom of the raster and if the amplitude of the vertical deflection is reduced at the ends of the horizontal lines. Mathematical analysis of the curvature of the dotted lines shows that they are hyperbolic in form so that the horizontal and vertical deflection yoke currents and, hence, the corresponding deflections, should be varied in hyperbolic fashion in order to eliminate the pincushion distortion completely. The circuits to be described generally provide a parabolic correction, but this is of little significance as it is well known that sections of a hyperbola may nearly coincide with a section of a properly chosen parabola.

Figure 2 is an illustrative embodiment of this invention that operates to reduce horizontal pincushion distortion. A source 2 of horizontal deflection current is connected in series with a horizontal deflection yoke 4, and a control impedance, formed by two oppositely poled coils 6 and 8 connected in series, is connected in shunt with the yoke 4. A source 10 of current having the same shape, phase and frequency as the current flowing in a vertical deflection yoke, not shown, is connected across similarly poled series control coils 12 and 14. The coil 12 is magnetically coupled to the coil 6 and the coil 14 is magnetically coupled to the coil 8. The magnetic coupling paths are independent of one another so that there is little or no coupling between the coils 12 and 8 and 14 and 6 respectively. In actual practice it may be more convenient to construct the device formed by the coils 6, 8, 12 and 14, as indicated in Figure 2A wherein C shaped cores are abutted to form a "figure 8" core 16, the control coils 12 and 14 being in the form of a single control coil 18 wound about the central leg 20 and the coils 6 and 8 being wound about the outer legs 22 and 24 in the directions indicated.

The coils 6 and 8 of Figure 2 could be similarly polarized if the control coils 12 and 14 are oppositely polarized. If the construction of Figure 2A is used, this change in polarization requires that the source 10 be connected in series with the coils 6 and 8 and that the coil 18 be connected in shunt with the horizontal deflection yoke 4. In this arrangement the coil 18 is a control impedance instead of a control coil. It will be apparent to those skilled in the art that either of these arrangements will operate to prevent voltages of the vertical deflection frequency from appearing across the horizontal deflection yoke 4 so that no currents of vertical deflection frequency flow in the horizontal deflection yoke 4. This prevents the skewing previously referred to.

The operation of Figure 2 may be further described as follows. Assume that the current flowing in the control coils 12 and 14 slowly varies in linear fashion from a maximum positive value through zero to a maximum negative value during a single vertical scan and that it then quickly reverts to its maximum positive value as indicated in Figure 3A. In a television receiver, video signals are reproduced during the slow scan and the beams are blanked out during the rapid scan. As is well known by those skilled in the art, the relationship between the magnetic flux B produced in most core materials varies with the magnetomotive force H producing it so as to form what is termed a hysteresis loop as indicated in Figure 3B. This relationship is often called the hysteresis loop of the material. As $H=4\pi NI$ where N is the number of turns in a winding and I the current through it, Figure 3A represents the relationship between the magnetic flux in the core and the current in the control coils 12 and 14. During the slow variation in current in the control coils 12 and 14, the flux B is as indicated by one side 26 of the hysteresis loop and during the rapid variation, known as flyback, the flux B is as indicated by the other side 28 of the loop. The side of the loop traversed during the slow variation is immaterial but assume, for purposes of explanation, that it is the side 26. Hence, as the current in the coils 12 and 14 varies, as indicated in Figure 3B, the flux in the cores of Figure 2 changes as indicated by the side 26 of the hysteresis loop.

Assuming that the current supplied by the source 2 is substantially constant, it is apparent that the portion of it flowing in the yoke 4 decreases as the impedance of the coils 6 and 8 decreases. The impedance of these coils depends on the rate of change of flux produced by the current flowing through them. Although it is difficult to represent the precise change in flux produced by these currents on the graph of Figure 3B, it can be seen that the variations in flux are reduced more and more as the ends of the curve 26 are approached. For example, assume that a particular line occurs near the bottom of the raster so that the flux produced by the action of the coils 6 and 8 is as indicated at the point 30. The currents of the horizontal deflection frequency flowing in the coils 6 and 8 causes the flux to vary between points 32 and 34 so that the average rate of change of flux during this line deflection may be approximately equal to the slope of a line 36 joining them. At the top of the raster where the flux present in the core due to the current in the windings 12 and 14 is as indicated at point 38 and the flux variations due to the current of horizontal deflection frequency lie between points 40 and 42, the line 44 joining them indicates the average rate of change of flux. On the other hand, during a line occurring in the center of the raster such as at a point 46, the current in the coils 6 and 8 may cause a variation in flux between the points 48 and 50 and the average rate of change of flux produced by this current may be approximated by the slope of a line 52 joining them. As the slope of the line 52 is greater than that of either of the lines 36 and 44, it can be seen that the inductance and hence the impedance of the coils 6 and 8 is less at the top and bottom of the raster. Hence more current flows in the coils 6 and 8 at the top and bottom of the raster than at the center. The net result is that the currents in the yoke 4 and hence the amplitude of horizontal deflection are less at the top and bottom of the raster than at the center.

The rate of change of flux for a given current change may be termed the incremental permeability *u*. At the operating points 30, 46, and 38, the *u* of the core of Figure 2 is equal to the slope of the lines 36, 52 and 44 respectively. The inductance of the coils 6 and 8 is proportional to the *u* of the cores. The manner in which *u* varies with the flux B, induced in the cores by the current in the coils 12 and 14, is represented by the graph of Figure 3C. This graph is proportional to the slope of the line 26 of Figure 3B. At the top of the raster, the flux in the cores is actually at a maximum value, but the rate of change of flux and hence, the *u* of the cores and the L of the coils 6 and 8 is at a minimum value. As the vertical deflection proceeds toward the center of the raster, the value of *u* and hence the inductance of the coils 6 and 8 increases. As the vertical deflection proceeds from the center of the raster toward the bottom, the *u* and inductance of the cores decreases. Hence, the curve of Figure 3C is traversed and retraversed as indicated by a line 54 and the variation of *u* and the inductance of the coils 6 and 8 is as indicated in Figure 3D.

It is readily apparent that the shape of the curve 26, i.e., one side of the hysteresis loop of Figure 3B determines the shape of the *u* vs. B characteristic of Figure 3C as well as the shape of the curve of Figure 3D. Therefore, the choice of core material having the proper hysteresis characteristics is important. Although variations may be made as required by different degrees of pincushion distortion, it can be said that the hysteresis loop should fit the equation $B=A_1(H-b)+A_2(H-b)^3$ where $A_1$ and $A_2$ are constants and $b$ is the flux existing at a point where $B=0$, for example point 46 of Figure 3B.

Examination of the hysteresis loop of Figure 3B also shows that the curve 26 is not symmetrical about the point 46 so that the variations in the *u* of the cores and hence the inductance of the coils 6 and 8 is not the same during the top and bottom halves of the raster. In some geometrical configurations of the target area and the center of beam deflection, a lack of symmetry may be required, but in others it may be desired to eliminate it. Accordingly, means may be provided for establishing a biasing flux in the cores. Although such a means may assume various forms, a simple way of doing it, if the various coils are mounted as shown in Figure 2A, is to provide an extra winding 58 on the central leg 20 and to provide means for causing a direct current of the proper value to flow through it.

Another way of analyzing the operation of the circuit of Figure 2 is to consider the saturable reactor formed by the coils 6, 8, 12 and 14 as shown in Figure 2, or by the coils 6', 8' and 18 of Figure 2A as a modulator. The non-linearity required by a modulator is supplied by the non-linear relationship between the flux in the core and the various coil currents. The signals applied to the modulator are sawtooth variations of current of the line deflection frequency that flow through the coils 6 and 8 from the source 2, as previously explained, and the sawtooth variations in current of a vertical deflection frequency that flow through the coils 12 and 14 from the source 10. The output of the modulator appearing across the yoke 4, as illustrated in Figure 4, includes the frequency components of the horizontal frequency sawtooth (15,750 c.p.s. for present television receivers) and its harmonics plus additional sidebands at intervals of the vertical deflection frequency (60 c.p.s. for present television receivers). However, because of the opposed polarities of one of the sets of coils, coils 6 and 8 in the embodiment of Figure 2, and 6' and 8' of Figure 2A, the components of the sawtooth of vertical deflection current supplied by the source 10 do not appear across the yoke 4. Therefore, it may be said that a modulator is provided in shunt with the horizontal deflection winding and that it is balanced against vertical deflection frequencies.

Either of these analyses shows that the impedance in shunt with the horizontal deflection yoke 4, whether such impedance be that of the coils 6 and 8 of Figures 2, or that of the coil 18 of Figure 2A, may vary in a generally parabolic manner as indicated in Figure 5. The consequent variations in amplitude of the horizontal deflection current flowing in the shunt path and in the yoke 4 are as indicated in Figures 6 and 7 respectively. Analysis of Figures 4, 6 and 7 shows that the presence of vertical deflection components would bend the center lines 60 and 62 so that skewing of the raster would result.

The circuit of Figure 8 operates in the same general manner as the circuit of Figure 2, but illustrates in more detail one form of the source 10 of vertical deflection current. For convenience, corresponding components of Figures 2 and 8 are indicated by the same numerals. It is customary to apply a sawtooth of voltage 62 to the grid of a vertical deflection driver tube 64. In order to produce a sawtooth of current in a coil 65, the sawtooth voltage wave 62 is also coupled to control grid 66 to a pentode 68 via a capacitor 70 and a potentiometer 72. Operating bias is provided for the pentode 68 by a capacitor 73 and a parallel resistor 74 connected between the cathode 76 and ground. One end of the coil 65 is connected to the plate 78 and the other is connected to a point of B+ so that a sawtooth of current flows in the coil 65 during a vertical cycle. It will be seen that the current in the coil 65 does not change direction so that the circuit thus far described would operate to make horizontal distortion correction at the lower end of the vertical deflection and no correction at the beginning of the vertical deflection. In order to provide for correction at each end of the vertical deflection, a bias winding 79 is connected between B+ and ground via a current controlling resistor 80. The current through the bias winding 79 creates a flux in the core that opposes the flux produced in the core by the sawtooth of current flowing in the coil 65. Hence, the flux in the core can be made to change from a maximum value in one direction at one end of vertical deflection to a maximum value in the other direction at the other end of vertical deflection. Accordingly, the combined effect of the coils 65 and 79 of Figure 8 on the flux in the core is the same as the effect of the coil 18 of Figure 2.

It may be desirable to provide a D.-C. beam centering current through the horizontal deflection winding 4 by placing it in series with a source of D.-C. potential such as a battery 82. In this event, a blocking capacitor 84 is placed in series with the coils 6 and 8 to prevent the centering current from flowing through them.

Various design considerations may require that the turns in the coils 65 and 79 be much greater than the turns in the coils 6 and 8. If the coils 6 and 8 were not oppositely wound, then a very high voltage would be induced in the coils 65 and 79 during blanking when the flux in the deflection winding 4 is rapidly decreasing.

Figure 9 is an illustrative embodiment of a vertical deflection circuit in which means are provided for eliminating or reducing pincushion distortion in the vertical deflection in accordance with this invention. It achieves the result by reducing the vertical deflection by greater and greater amounts on either side of the center of each line of the raster. A source 86 provides vertical deflection current having a sawtooth shape, the current changing in linear manner from a maximum positive value through zero to a maximum negative value. A vertical deflection yoke 88 is connected in series with the source 86, and an impedance in the form of series-connected oppositely-wound coils 90 and 92 is connected in shunt with the deflection yoke 88. A source 94 of current corresponding to the sawtooth horizontal deflection current is connected in series with similarly wound coils 96 and 98. A core 100 of magnetic material provides magnetic coupling between the coils 96 and 90 and a core 102 provides magnetic coupling between the coils 98 and 92. Instead of having two coils, such as 96, 98, and two separate cores, such as 100, 102, a structure similar to that shown in Figure 2A could be used, in which event the winding on the central leg 20 would be connected in series with the source 94 and the windings on the outer legs would be connected in shunt with the vertical deflection yoke 88.

One explanation of the operation of the circuit of Figure 9 is as follows. The current in the coils 96, 98 swings linearly from a positive maximum value through zero to a maximum negative value at a horizontal deflection frequency and is of sufficient amplitude to saturate the cores 100 and 102. As previously pointed out with the aid of Figures 3A, 3B, 3C and 3D, the nearer the core is to saturation, the less is the rate of change of flux for a given change in current in a coil on the core. Hence, the inductance of the coils 90 and 98 is a maximum at the center of each horizontal line and decreases toward the ends. This results in more of the vertical deflection current flowing through the shunt path formed by the coils 90 and 92 at the ends of the horizontal deflection lines. The change in the inductance of the coils 90, 92 is approximately the same during every line of the raster as the same amount of current flows in the coils 96, 98 during each horizontal deflection. However, the current of vertical deflection frequency supplied by the source 86 varies from a maximum positive value at one end of the raster to zero at the center and then to a maximum negative value at the other end of the raster so that the actual change in current flowing in the coils 90, 92 and hence the change in current in the deflection yoke 88 during each scanned line is zero at the center and greater as the ends of the raster are approached. At the center of each horizontal line, the current supplied by the source 94 is zero so that the impedance of the coils 90, 92 is unchanged, and have their normal value. Figures 10, 11 and 12 respectively illustrate the changes in the current in the yoke 88; the changes in current in the shunting coils 92, 94 and the changes in impedance of the coils 92, 94. In each of these drawings, the letter L indicates a line interval. In an actual case, there would be many more line intervals.

Another explanation of the operation of the circuit of Figure 9 is to consider that the coils 90, 92, 96, 98 and the cores 100, 102 form a modulating device wherein the currents of vertical deflection frequency that flow in the shunt coils 90, 92 are modulated at a line deflection rate by the current in the coils 96, 98. As illustrated in Figure 13, the product of modulation includes components representing the sawtooth form of vertical deflection current and the sidebands of the line frequency components. However, in order to prevent tilting of the horizontal lines in the raster the modulator is balanced against frequencies of the horizontal deflection current in the coils 96, 98.

Consideration is now given to the embodiment of the invention shown in Figure 14 wherein means are provided for simultaneously correcting pincushion distortion in the horizontal as well as the vertical directions. A source 104 of horizontal deflection current that varies from a maximum positive value through zero to a maximum negative value or vice versa is coupled in any suitable manner as by a transformer 106 having a primary winding 108 and a secondary winding 110 to a horizontal deflection yoke 112. Series-connected coils 114 and 116 are connected in shunt with the yoke 112. A source 118 of vertical deflection current that varies from a maximum positive value through zero to a maximum negative value or vice versa is coupled in any suitable manner as by a transformer 120 having a primary winding 122 and a secondary winding 124 to a vertical deflection yoke 126. Serially-connected coils 128 and 130 are connected in shunt with the yoke 126. A core 132 provides a low-reluctance magnetic coupling between the coils 114 and 128 and a core 134 provides a low-reluctance magnetic coupling between the coils 116 and 130. As indicated by the dots, the coils 128 and 130 are wound in opposite directions and the coils 114 and 116 are wound in the same direction. Alternatively, the coils 114, 116 could be wound in opposite directions and the coils 128, 130 wound in the same direction.

The operation of the simultaneous pincushion correction circuit of Figure 14 is similar to the operation of Figures 2 and 9 previously discussed. Current of vertical frequency flowing in the coils 128 and 130 modulates the magnitude of the impedance of the coils 114 and 116 in the same manner as the currents in the coils 12 and 14 of Figure 2 modulated the impedance of the coils 6 and 8, and current of horizontal deflection frequency flowing in the coils 114 and 116 modulates the magnitude of the impedance of the coils 128 and 130 in the same manner as current in the coils 96, 98 of Figure 9 modulates the magnitude of the impedance of the coils 90 and 92. It will be noted that the polarities of the coils 114, 116, 128 and 130 is such that the transformer formed by them is balanced against the transfer of voltages of the sources 104 and 118, so that no voltages of the horizontal deflection frequency appear across the coils 128, 130 and no voltages of the vertical deflection frequency appear across the coils 114, 116. In this way skewing of the raster is prevented. It will be understood that the same effect can be obtained if the coils 114, 116 are wound in series opposition and the coils 128, 130 in series aiding.

Figure 15 illustrates a pincushion correction circuit, similar to Figure 14 except that the series aiding coils 114, 116 of Figure 14 are now connected in parallel. For convenience all components are indicated by the same numerals as in Figure 14.

In order to obtain best results the impedance of a source of deflection current for one deflection system should be of the same order of magnitude as the impedance of the associated deflection yoke for frequencies of the modulation components of the other deflection system. For example, in Figure 2, if the impedance of the source 2 of horizontal deflection frequencies is less than the impedance of the horizontal deflection yoke 4 for the modulation components of the vertical deflection frequencies, it can be seen that the correction components about the vertical deflection frequency will be shunted around the yoke 4. Fortunately, the source 2 usually includes a driver tube and the rather high plate impedance of this tube is the impedance of the source. If such were not the case, impedance for the modulation components of the vertical deflection frequencies should be inserted in series with the source 2. In the circuit of Figure 9, the impedance of the source 86 for horizontal deflection frequencies should be equal to or greater than the impedance of the yoke 88 for the same frequencies if the correction components of the current are not to be unduly shunted around the yoke 88. In many deflection systems it will be found that the impedances for horizontal deflection frequencies are primarily inductive reactances and that the reactance of the source 86 is usually less than the reactance of the yoke 88. Under this condition, an inductance 87 can be inserted in series with the source 86. The provision of proper source impedances can be achieved by suitable coupling transformers as in Figures 14 and 15.

Previously, the impedances discussed have been inductances and the control has been exercised through magnetic coupling. However, as can be seen from the simultaneous pincushion correction circuit of Figure 16, capacitative impedances that operate in response to voltages may be used. In this arrangement, a source 132′ of horizontal deflection current is connected in series with a horizontal deflection yoke 134′. A resistor 136, and an inductance 138 represent the internal impedance of the source 132′, and a resistor 140 represents the effective resistance of the yoke 134′. A source 142 of vertical deflection current having an internal impedance, represented by a resistor 144 and an inductance 146, is connected in series with a vertical deflection yoke 148 having an effective resistance represented by a resistor 150. A bridge circuit is coupled between the yokes 134′ and 148 and is comprised of a first pair of capacitors 152 and 154 connected in series parallel relationship with the yoke 148 and a second pair of capacitors 156 and 158 connected in series parallel relationship with the first pair of capacitors and the yoke 148. One end of the deflection yoke 134′ is connected to a junction 160 between the first pair of capacitors 152 and 154, and the other end of the deflection yoke 134′ is coupled to a junction 162 between the second pair of capacitors 156 and 158. As is well known the voltage across the horizontal deflection yoke 134′ may well be as indicated by the wave 164. During each line scansion, the wave may vary from a negative value through zero to a positive value. During the flyback period when the beam reverts to its initial position, a highly negative pulse 166 is usually present. Assuming that the negative pulse 166 appears at the upper end of the yoke 134′ and that its presence at the junction 162 would cause difficulty, a diode 168 may be connected between the upper end of the yoke 134′ and the junction 162. A resistor 170 may be connected in shunt with the diode to provide a direct current return path. By suitable design the diode 168 may be biased so as not to conduct during the pulse 166. The capacitors 156 and 158 are of a type that exhibits a nonlinear change of capacitance with the magnitude of the applied voltage, but the capacitors 152 and 154 do not change capacitance with applied voltage. The capacitor 156 and 158 may have insulating material of barium titanate so that the variation of capacitative reactance for any frequency with the magnitude of the applied voltage is similar to the variations of $u$ with the flux as illustrated by Figure 3*c*. As is well understood by those skilled in the art, the voltage wave across the vertical deflection yoke 148 will be indicated by the wave 172, which changes from a maximum negative value through zero to a maximum positive value.

The operation of the circuit of Figure 16 is as follows. One diagonal of the bridge network formed by the capacitors 152, 154, 156 and 158 lies between the junctions 160 and 162 and the other diagonal lies between points 174 and 176. The application of the sloping portion of the wave 164 between the junctions 160 and 162 causes the capacitance of the capacitors 156 and 158 to vary in a non-linear fashion so that the capacitative reactance in shunt with the deflection yoke 148 varies in non-linear fashion. As the voltage applied to the capacitors 156 and 158 increases at the ends of each line scansion, the reactance of the capacitors 156 and 158, the current in the yoke 148 and the resultant vertical deflection, all decrease as required for reduction of pincushion distortion in the vertical direction. At the top and bottom of the vertical deflection, the wave 172 has a maximum magnitude so that the reactance of the capacitors 156 and 158 is decreased. This results in a reduction in the reactance between the junctions 160 and 162 and hence a reduction in the reactance in shunt with the horizontal deflection yoke 134′ as well as a reduction in the current flowing in the horizontal deflection yoke 134′.

As was the case when inductive reactances were used, the bridge circuit of capacitative reactances operates to prevent the horizontal deflection frequency from appearing in the vertical deflection yoke and vice versa. That this is so can be seen from the fact that the yokes are connected across different diagonals of a balanced bridge network. Hence, the bridge network can be regarded as a modulator that is balanced against the control signals. Hence, the control signal 164, appearing across the horizontal deflection yoke 134′ and applied across the diagonal 160, 162 modulates the vertical deflection voltages or currents 172, applied across the other diagonal 174, 176, but the control voltage 164 itself does not appear across the vertical deflection yoke 148. Similarly, the bridge network is balanced against the control voltage 172 so that this voltage itself does not appear across the horizontal deflection yoke 134′ even though the modulation products of the control voltage 172 and the horizontal deflection voltages do appear across the horizontal deflection yoke 134'.

So far the discussion has been directed to circuits for reducing or eliminating pincushion distortion. We now turn to circuits for reducing or eliminating barrel distortion, such as indicated by the dotted line of Figure 17. In general the circuit is the same as the circuits for the elimination of pincushion distortion, except that the control impedances are in series with the deflection yokes instead of being in shunt with them. In the embodiment of the invention shown in Figure 18, a source 196 of horizontal deflection current may be coupled, as by a transformer 198, having a primary winding 200 and a secondary winding 202, to the series combination of a horizontal deflection yoke 204 and control coils 206 and 208. A source 210 of vertical deflection current is coupled, as by a transformer 212, having a primary winding 214 and a secondary winding 216, to the series combination of a vertical deflection yoke 218 and control coils 220 and 222. The control coils 206 and 220 are magnetically coupled via a core 224 and the control coils 208 and 222 are coupled via a core 226. These control coils are polarized as shown and operate substantially the same as explained in connection with the coils 114, 116, 128, and 130 of Figure 14. It will be remembered that the changes in impedance of these coils were the same as the changes in impedance of the coils 6, 8 of Figure 2 and 90, 92 of Figure 9. The actual changes in impedances are the same as before. For example, the series impedance of the coils 206 and 208 varies as indicated in Figure 19, which will be seen to be the same as the impedance variation of the control coils 6 and 8 of Figure 2, as shown in Figure 5. However, the consequent change in horizontal yoke current, as indicated in Figure 20 is seen to increase toward the top and bottom of the vertical deflection, whereas in the circuit of Figure 2, the yoke current decreased toward the top and bottom of the vertical deflection as indicated in Figure 6. Such variation in horizontal yoke current is essential to correct for barrel distortion as the top and bottom of the raster need to be widened. The variation in the impedance of the control coils 220 and 222 is as indicated in Figure 21, which by comparison to Figure 12 can be seen to be the same as the variation in impedance of the coils 122 and 130 of Figure 14. However, because the control coils 220 and 222 are in series with the vertical deflection yoke 218, the variation in current and in this yoke is as indicated in Figure 22. An examination of Figure 22 shows that the vertical deflection current is a maximum at the ends of a line so as to correct for the barrel type distortion.

Figure 23 indicates a raster in which pincushion distortion is present in the horizontal direction and barrel distortion is present in the vertical direction. The circuit of Figure 18 could be adapted to correct these combined types of distortion by connecting the control coils 206 and 208 in parallel with the deflection yoke 204. Their relationship to the control coils 220 and 222 would be undisturbed. If the pincushion distortion were in the vertical direction and the barrel distortion in the horizontal direction, the control coils 220 and 222 of Figure 18 would be placed in parallel with the yoke 218.

While we have illustrated a particular embodiment of our invention, it will of course be understood that we do not wish to be limited thereto, since various modifications, both in the circuit arrangement and in the instrumentalities, may be made and we contemplate by the appended claims to cover any such modifications as fall within the true spirit and scope of the invention.

What we claim and desire to secure by Letters Patent of the United States is:

1. A magnetic deflection system comprising in combination a source of deflection current of one frequency, a yoke coupled to said source, first and second coils, means for connecting said first and second coils in parallel relationship with said yoke, a source of deflection current of a different frequency, third and fourth coils connected in series with said source, a first core mounted so as to magnetically couple said first and third coils, and a second core mounted so as to magnetically couple said second and fourth coils.

2. A magnetic deflection system as set forth in claim 1 wherein either said first and second coils or said third and fourth coils are connected in series opposition.

3. In combination a source of current of substantially sawtooth wave shape and having a horizontal deflection frequency, a horizontal deflection yoke, means for coupling said yoke to said source, first and second coils connected in series parallel relationship with said horizontal deflection yoke, a source of current of substantially sawtooth wave shape and having vertical deflection frequency, a vertical deflection yoke, means for coupling said vertical deflection yoke to said latter source, third and fourth coils connected in series parallel relationship with said vertical deflection yoke either said first and second coils or said third and fourth coils being connected in series opposition, and means for providing magnetic coupling between said first and third and said second and fourth coils respectively.

4. A circuit for correcting pincushion raster distortion comprising, in combination, a source of substantially sawtooth deflection current of a horizontal deflection frequency, a horizontal deflection yoke, means for coupling said yoke to said source, first and second coils connected in parallel with said yoke, a source of substantially sawtooth deflection current of a vertical deflection frequency, a vertical deflection yoke, means for coupling said vertical deflection yoke to said latter source, a circuit comprised of third and fourth coils connected in series, connections for placing said circuit in parallel with said vertical deflection yoke, said third and fourth coils being wound in series opposition, means including a first core for providing magnetic coupling between said first and third coils, and means including a second core for providing magnetic coupling between said second and fourth coils.

5. A circuit for correcting barrel type raster distortion comprising, in combination, a source of sawtooth current of horizontal deflection frequency, a first series circuit comprised of a horizontal deflection yoke and a first pair of coils comprised of a first coil and a second coil, means for coupling said first series circuit to said source, a source of sawtooth current of vertical deflection frequency, a second series circuit comprised of a vertical deflection yoke and a second pair of coils comprised of a third coil and a fourth coil, means for coupling said second series circuit to said latter source, one of said pairs of coils being wound in series opposition, a first core of magnetic material mounted so as to aid in magnetic coupling of said first and third coils and a second core of magnetic material mounted so as to aid in coupling said second and fourth coils.

6. A circuit for reducing barrel type raster distortion in one direction comprising a source of deflection current of one frequency, a series circuit comprised of a first pair of coils comprised of a first coil and a second coil and a deflection yoke, means for coupling said series circuit to said source, a source of current corresponding to deflection currents of a different frequency, a second pair of coils comprised of a third coil and a fourth coil connected in series, means for coupling said second pair of coils to said latter source, one of said first and second pairs of coils being wound in series opposition, a first core of magnetic material mounted so as to provide magnetic coupling of said first and third coils and a second core of magnetic material mounted so as to provide magnetic coupling of said second and fourth coils.

7. A circuit for correcting pincushion distortion in a raster comprising, in combination, a source of deflection currents of one deflection frequency, a first deflection yoke, means coupling said deflection yoke to said source, a source of deflection current of another deflection frequency, a second deflection yoke, means for coupling said second deflection yoke to said latter source, first and second capacitative reactances connected in series parallel relationship with said second yoke, third and fourth capacitances connected in series parallel relationship with said second yoke, said first and second capacitances having a capacitance that varies non-linearly with an applied voltage, means for connecting the junction of said third and fourth capacitative reactances to one side of said first mentioned source, and means including a unilateral conducting device for connecting the other side of said first mentioned source to the junction between said first and second capacitances.

8. A deflection circuit comprising in combination a source of deflection current waves of one frequency, a deflection yoke coupled to said source so as to be traversed by at least a portion of the deflection currents provided by said source, a first and a second coil forming a first pair coupled to said source and said deflection yoke so as to be traversed by at least a portion of the deflection current provided by said source, a source of deflection current waves of a different frequency, third and fourth coils forming a second pair coupled to said latter source so as to be traversed by current provided by said latter source, means including a core for magnetically coupling said first and third coils, means including a core for magnetically coupling said second and fourth coils, one of said pairs of coils being wound in opposite polarities and the other of said pairs of coils being wound in like polarity.

9. A circuit for correcting raster distortion comprising a source of substantially sawtooth deflection current of a first frequency, a deflection yoke designed to operate at the first frequency, means coupling said deflection yoke to said source such that said deflection yoke is traversed by current provided by said source, an impedance coupled to said deflection yoke to control the amount of deflection current flowing therein depending on the value of said impedance for currents of the first frequency, said impedance being such as to exhibit a generally parabolic change in value when a sawtooth electrical wave is applied thereto, a source of electrical waves of a substantially sawtooth shape having a second deflection frequency, and means for applying said latter waves to said impedance so as to change its value in a generally parabolic manner.

10. A circuit as set forth in claim 9, wherein said impedance is connected in shunt with said deflection yoke.

11. A circuit as set forth in claim 10 wherein said impedance is connected in series with said deflection yoke.

12. A circuit for correcting pincushion raster distortion comprising a source of sawtooth deflection current of a horizontal deflection frequency, a horizontal deflection yoke, means for coupling said yoke to said source, first and second coils comprising a first pair connected across said horizontal deflection yoke, a source of sawtooth deflection current of a vertical deflection frequency, third and fourth coils comprising a second pair connected in series across said latter source, a first core of magnetic material coupling said first and third coils, a second core of magnetic material coupling said second and fourth coils, one of said pairs of coils being wound in series opposition, the other of said pairs of coils being wound in series aiding.

13. A circuit as set forth in claim 12 wherein said first and second cores are comprised of magnetic material having a hysteresis loop defined by the equation $B=A_1(H-b)+A_2(H-b)^3$ where B is the total flux, $A_1$ and $A_2$ are constants and $b$ is the magnetic flux existing at a point where $B=0$.

14. A circuit as set forth in claim 12 wherein said coils of said first pair are connected in series across said horizontal deflection yoke.

15. A circuit as set forth in claim 12 wherein said coils of said first pair are connected in parallel across said horizontal deflection yoke.

16. A circuit for correcting pincushion distortion in a raster comprising a source of sawtooth deflection current of a vertical deflection frequency, a vertical deflection yoke, means for coupling said yoke to said source, first and second coils comprising a first pair connected in series across said vertical deflection yoke, a source of sawtooth deflection current of horizontal deflection frequency, third and fourth coils comprising a second pair connected across said latter source, a first core of magnetic material coupling said first and third coils, a second core of magnetic material coupling said second and fourth coils, one of said pairs of coils being wound in series opposition, the other of said pairs of coils being wound in series aiding.

References Cited in the file of this patent

UNITED STATES PATENTS

| | | |
|---|---|---|
| 2,482,150 | Bocciarelli | Sept. 30, 1949 |
| 2,534,557 | Ostreicher | Dec. 19, 1950 |
| 2,574,946 | White | Nov. 13, 1951 |
| 2,575,477 | Weimer | Nov. 20, 1951 |
| 2,582,014 | France et al. | Jan. 8, 1952 |
| 2,620,456 | White | Dec. 2, 1952 |
| 2,649,555 | Lockhart | Aug. 18, 1953 |
| 2,749,475 | Vandeschmitt | June 5, 1956 |
| 2,796,552 | Dietch | June 18, 1957 |
| 2,842,709 | Lufkin | July 8, 1958 |